US007141642B2

(12) United States Patent
Hayakawa et al.

(10) Patent No.: US 7,141,642 B2
(45) Date of Patent: Nov. 28, 2006

(54) PROCESS FOR PRODUCING POLYMERIZABLE POLYBRANCHED POLYESTER

(75) Inventors: Hitoshi Hayakawa, Yachiyo (JP); Koichiro Matsuki, Sakura (JP); Masayuki Moriwaki, Chiba (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/536,191

(22) PCT Filed: Nov. 25, 2003

(86) PCT No.: PCT/JP03/15020
§ 371 (c)(1),
(2), (4) Date: May 24, 2005

(87) PCT Pub. No.: WO2004/048439
PCT Pub. Date: Jun. 10, 2004

(65) Prior Publication Data
US 2006/0047140 A1    Mar. 2, 2006

(30) Foreign Application Priority Data
Nov. 26, 2002    (JP) .............................. 2002-342118

(51) Int. Cl.
*C08G 53/82* (2006.01)
*C08K 3/10* (2006.01)
(52) U.S. Cl. ...................... 528/271; 524/784; 524/322; 528/361; 528/392
(58) Field of Classification Search ................ 528/271, 528/361, 392; 524/784, 322
See application file for complete search history.

(56) References Cited

U.S. PATENT DOCUMENTS

| 3,669,939 | A | | 6/1972 | Baker et al. |
| 5,136,014 | A | | 8/1992 | Figuly |
| 5,418,301 | A | | 5/1995 | Hult et al. |
| 5,606,103 | A | | 2/1997 | Trapasso et al. |
| 6,114,489 | A | * | 9/2000 | Vicari et al. .................. 528/84 |

FOREIGN PATENT DOCUMENTS

| JP | 9-183751 | 7/1997 |
| JP | 2000-311516 | 11/2000 |

* cited by examiner

*Primary Examiner*—Samuel A. Acquah
(74) *Attorney, Agent, or Firm*—Armstrong, Kratz, Quintos, Hanson & Brooks, LLP

(57) ABSTRACT

The present invention allows the production of a polymerizable hyperbranched polyester by introducing polymerizable unsaturated double bonds into the molecular terminals of a hyperbranched polyester polyol (A), which is obtained by condensation polymerization a polyhydroxy monocarboxylic acid in which there are at least two hydroxyl groups, the carbon atom adjacent to the carboxy group is saturated carbon atom, and the hydrogen atoms on said carbon atom are all substituted, by reacting the hyperbranched polyester polyol (A) and an alkyl ester of a carboxylic acid having a polymerizable unsaturated double bond (B) by a transesterification in the presence of at least one type of transesterification catalyst (C) selected from the group consisting of a dialkyl tin oxide and a stanoxane, without causing side reactions such as nucleophilic addition reactions of terminal hydroxyl groups to polymerizable unsaturated double bonds of the hyperbranched polyester polyol (A), or thermal polymerization of the polymerizable unsaturated double bonds. The polymerizable hyperbranched polyester can be produced at high efficiency using a transesterification that uses as an alkyl ester of a carboxylic acid having a polymerizable unsaturated double bond (B), which is easily obtained as an industrial raw material, and without altering the original backbone structure of the molecular chains of the hyperbranched polyester polyol (A) by hydrolysis and so forth.

13 Claims, 1 Drawing Sheet

PROCESS FOR PRODUCING POLYMERIZABLE POLYBRANCHED POLYESTER

TECHNICAL FIELD

The present invention relates to a production process of a polymerizable hyperbranched polyester useful in a wide range of applications including paints, coating materials, adhesives, films, sheets, moldings and electronic materials.

Furthermore, the present application is based on Japanese Patent Application No. 2002-342118, the content of which is incorporated herein by reference.

BACKGROUND ART

Hyperbranched polymers, in which molecular chains extending from a branching point located in the center have additional branching points, and the number of terminals increases moving away from the center, are expected to be used in various applications due to their large number of terminals and their unique molecular form.

Known examples of hyperbranched polymers include hyperbranched polyester polyols having hydroxyl groups on the terminals of their molecular chains (e.g., specification of U.S. Pat. No. 3,669,939), and attempts have been made to introduce functional groups having even higher reactivity or different forms of reactivity into the molecular chains by using the reactivity of these hydroxyl groups. In particular, multifunctional hyperbranched polymers, in which polymerizable unsaturated double bonds have been introduced into the molecular chains or terminals thereof, are useful as macromonomers, polymer modifiers, functional polymers or multifunctional reaction intermediates.

Numerous attempts have been made to produce polyesters in which polymerizable unsaturated double bonds have been introduced into the molecular terminals of hyperbranched polyester polyols by esterifying the hydroxyl groups of these hyperbranched polyester polyols. Typical examples of these processes are described in (1) to (4) below.

(1) A process in which a hyperbranched polyester polyol is esterified with acrylic acid by dehydration in the presence of methane sulfonic acid (refer to, for example, U.S. Pat. No. 5,418,301).

(2) A process in which a hyperbranched polyester polyol is esterified with methacrylic anhydride in the presence of N,N-dimethylaminopyrridine (refer to, for example, M. Johansson, et al., Journal of Applied Polymer Science (USA), Vol. 75, p. 612 (2000)).

(3) A process in which a hyperbranched polyester polyol is esterified with acryloyl chloride in the presence of triethylamine or N,N-dimethylaminopyrridine (refer to, for example, J. Lang, et al., Polymer (UK), Vol. 42, p. 7403 (2001); and, M. Johansson, et al., Journal of Coating and Technology (USA), Vol. 67, p. 35 (1995)).

(4) A two-stage esterification process in which a hyperbranched polyester polyol is reacted with methacrylic anhydride followed by once separating and purifying the product and then reacting with methacryloyl chloride in the presence of triethylamine (refer to, for example, Q. Wan, et al., Journal of Macromolecular Science Pure and Applied Chemistry (USA), Vol. A37, p. 1301 (2000)).

However, in the case of using a carboxylic acid having a polymerizable unsaturated double bond with low electron density in the manner of (meth)acrylic acid as in the process of (1) above, in addition to the desired dehydration esterification reaction, side reactions occurs in the form of not only a thermal polymerization reaction of the polymerizable unsaturated double bond, but also a nucleophilic addition reaction between hydroxyl groups and polymerizable unsaturated double bonds of the hyperbranched polyester polyol. As a result, there are the problems of increased susceptibility to gelling of the reaction system and a reduction in the number of polymerizable unsaturated double bonds introduced into the molecular terminals.

In addition, in the case of carrying out a dehydration esterification reaction using an acid catalyst as in the process of (1) above, there is also the problem of the occurrence of a side reaction in the form of hydrolysis of the ester bonds of the molecular chains.

Moreover, in the case of esterification reactions using acid anhydrides or acid halides as in each of the processes of (2), (3) and (4) above, there are the problems of increased susceptibility to gelling of the reaction system and a reduction in the number of polymerizable unsaturated double bonds introduced into the molecular terminals in the same manner as the case of (1) above caused by the basic substance used as catalyst or acid receptor.

In addition, in the case of using an acid anhydride or acid halide as in each of the processes of (2), (3) and (4) above, there are also problems in terms of use of the process as an industrial production process as compared with the use of carboxylic ester, including (a) the increased difficulty to obtain such raw materials in industrial scale or limitations on the types of applicable compounds, (b) difficulties in handling such as the need to take precautions regarding reaction with moisture in the air and so forth due to the high reactivity of these compounds, and (c) the need to remove the salts that are formed by the reaction of the acid halide and acid receptors.

If it were possible to introduce polymerizable unsaturated double bonds into the terminals of a hyperbranched polyester polyol by a transesterification without causing the aforementioned problems, such a process would be extremely useful industrially.

However, such an industrially useful transesterification has not been known. The main reasons for this are surmised from (a) and (b) below. Namely, (a) since hyperbranched polyester polyols have extremely high branching density, they are subjected to powerful steric hindrance during the transesterification, thus causing the problem in which the introduction of polymerizable unsaturated double bonds into the terminals does not reach a satisfactory level; and (b) since hyperbranched polyester polyols have a high hydroxyl group content, they are susceptible to the occurrence of nucleophilic addition reactions of the terminal hydroxy groups to polymerizable unsaturated double bonds, thereby resulting in the problem of increased susceptibility to gelling of the reaction system and a reduction in the number of polymerizable unsaturated double bonds introduced into the terminals.

On the other hand, a process is also known in which an alkyl ester of a carboxylic acid having polymerizable unsaturated double bonds in the manner of (meth)acrylic acid alkyl esters and a lower alcohol monomer having 2 to 6 hydroxyl groups in a molecule are reacted by transesterification in the presence of a stanoxane of transesterification catalyst to introduce polymerizable unsaturated double bonds into the lower alcohol monomer terminals (refer to, for example, Japanese Unexamined Patent Application, First Publication No. Hei 9-183751 (U.S. Pat. No. 5,606,103)).

However, the introduction of polymerizable unsaturated double bonds into a hyperbranched polyester polyol is not described in Japanese Unexamined Patent Application, First Publication No. Hei 9-183751 (U.S. Pat. No. 5,606,103). For this reason, even if this Japanese Unexamined Patent Application, First Publication No. Hei 9-183751 (U.S. Pat. No. 5,606,103) exists, it has been unknown as to whether or not the problems of (a) and (b) above can be resolved by the use of a transesterification catalyst composed of stanoxane.

DISCLOSURE OF THE INVENTION

The object of the present invention is to provide a production process that satisfies the following conditions of (i) to (iv) in a process for producing a polymerizable hyperbranched polyester by introducing polymerizable unsaturated double bonds using a transesterification into the terminals of a hyperbranched polyester polyol (to be referred to as hyperbranched polyester polyol (A)) obtained by condensation polymerization of a polyhydroxy monocarboxylic acid in which there are at least two hydroxyl groups, the carbon atom adjacent to the carboxy group is saturated carbon atom, and the hydrogen atoms on said carbon atom are all substituted:

(i) there is no occurrence of side reactions such as nucleophilic addition reactions between the terminal hydroxyl groups of hyperbranched polyester polyol (A) and the polymerizable unsaturated double bonds, or thermal polymerization reactions of the aforementioned polymerizable unsaturated double bonds;
(ii) the original backbone structure of the molecular chains of hyperbranched polyester polyol (A) must not be altered by hydrolysis and so forth;
(iii) the raw materials for the process will be easily available in industrial scale; and,
(iv) the reaction proceeds at high efficiency.

As a result of extensive studies to solve the aforementioned problems, the inventors of the present invention found that all of the aforementioned problems can be solved only in the case of using a specific catalyst as a transesterification catalyst, thereby leading to completion of the present invention.

Namely, in order to solve the aforementioned problems, the present invention provides a production process of a polymerizable hyperbranched polyester comprising: introducing polymerizable unsaturated double bonds into terminals of a hyperbranched polyester polyol (A) by reacting the hyperbranched polyester polyol (A) with an alkyl ester of a carboxylic acid having a polymerizable unsaturated double bond by a transesterification in the presence of at least one type of transesterification catalyst (C) selected from the group consisting of a dialkyl tin oxide and a stanoxane.

BEST MODE FOR CARRYING OUT THE INVENTION

Figure 1:
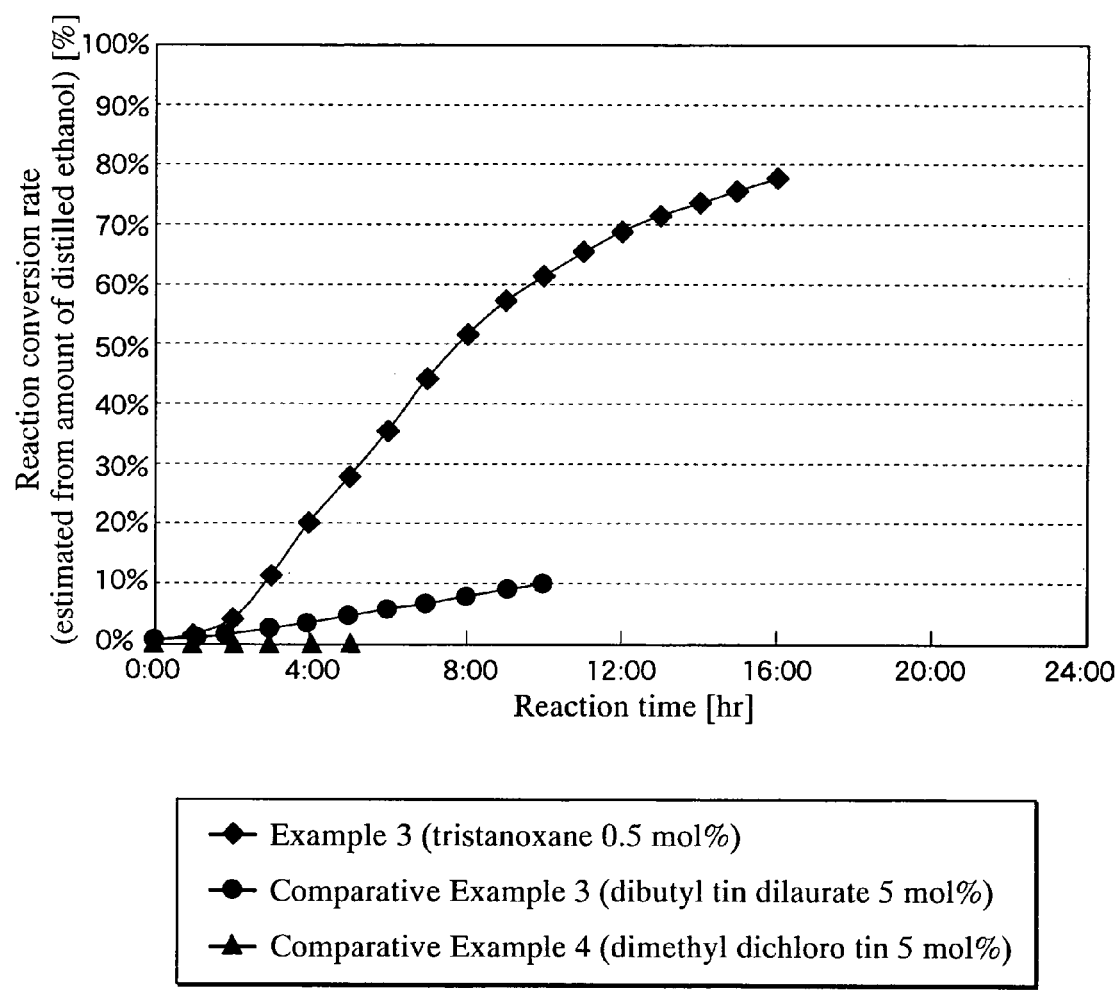
FIG. 1 is a graph showing the relationship between reaction time and the reaction conversion rate corresponding to the introduction rate of polymerizable unsaturated double bonds in transesterifications carried out in Example 3, Comparative Example 3 and Comparative Example 4.

The hyperbranched polyester polyol (A) used in the production process of the present invention is obtained by condensation polymerization of a polyhydroxy monocarboxylic acid in which there are at least 2 hydroxyl groups, the carbon atom adjacent to the carboxy group is saturated carbon atom, and all of the hydrogen atoms on said carbon atom are substituted. In addition, the hyperbranched polyester polyol (A) used in the production process of the present invention preferably has a weight-average molecular weight (Mw) of 1500 to 60,000. In addition, the aforementioned hyperbranched polyester polyol (A) preferably has a number-average molecular weight (Mn) of 750 to 55,000. Moreover, the hyperbranched polyester polyol used in the production process of the present invention particularly preferably has a ratio of Mw to Mn of 1.1 to 2.5. In addition, the aforementioned hyperbranched polyester polyol preferably has 12 to 600 hydroxyl groups per molecule.

In addition, the degree of branching (DB) of the hyperbranched polyester polyol (A) used in the production process of the present invention is preferably 0.25 to 1.0. In the present invention, the aforementioned degree of branching (DB) is defined by the following formula:

$$DB = \frac{(D+T)}{(D+T+L)}$$

(wherein, D represents the number of the aforementioned polyhydroxy monocarboxylic acid units that compose the branched parts in a molecule of the aforementioned hyperbranched polyester polyol (A), L represents the number of polyhydroxy monocarboxylic acid units that compose the linear parts in a molecule of hyperbranched polyester polyol (A), and T represents the number of polyhydroxy monocarboxylic acid units that compose the terminal parts in a molecule of hyperbranched polyester polyol (A)).

The aforementioned values of D, L and T can be determined from the integration values of the characteristic peak signals of the carbon atom at 2-position of the carbonyl carbon of the aforementioned three types of polyhydroxy monocarboxylic acid units in $^{13}$C-NMR (nuclear magnetic resonance spectroscopy). The details of this procedure are disclosed in "Macromolecules" (Vol. 28, p. 1698, 1995) (the contents of which are incorporated herein).

Examples of the aforementioned polyhydroxy carboxylic acid include 2,2-bis(hydroxymethyl)propionic acid, 2,2-bis (2-hydroxyethyl)propionic acid, 2,2-bis (3-hydroxypropyl) propionic acid, 2,2-bis (hydroxymethyl)butanoic acid, 2,2-bis (2-hydroxyethyl)butanoic acid, 2,2-bis (3-hydroxypropyl)butanoic acid, 2,2-bis (hydroxymethyl)valeric acid, 2,2-bis (2-hydroxyethyl)valeric acid, 2,2-bis (3-hydroxypropyl) valeric acid, 2,2,2-tris(hydroxymethyl)acetic acid, 2,2,2-tris (2-hydroxyethyl)acetic acid and 2,2,2-tris(3-hydroxypropyl) acetic acid.

By condensation polymerization of the aforementioned polyhydroxy monocarboxylic acid, a compound may be used as necessary as a seed that has functional groups that can form chemical bonds with the carboxy group, but does not have a functional group that has reactivity to hydroxyl groups. The molecular weight and molecular weight distribution of the resulting hyperbranched polyester polyol (A) can be controlled by condensation polymerization of a polyhydroxy monocarboxylic acid while using such a compound for the seed. Examples of such compounds that serve as seeds include alcohols, epoxy compounds and amines having one or two or more functional groups in their molecule that chemically bond with a carboxy group by reacting with it. Specific examples of seed compounds include 2,2'-[oxybis(methylene)]bis[2-ethyl-1,3-propanediol] (common name: Ditrimethylol propane), 1,1,1-tris (hydroxymethyl)propane (common name: Trimethylol propane), pentaerythritol, dipentaerythritol, glycerin, bisphenol A and their alkylene oxide modification products as well as glycidyl ethers; amine compounds such as ethylene diamine, bis(3-aminopropyl) ether, 1,2,3-tris-(3-aminopropoxy)propane, phenylene diamine and 4,4'-methylenedianiline, and multifunctional alcohols that are their alkylene oxide modification products.

A hyperbranched polyester polyol (A) used in the production process of the present invention is obtained by mixing the aforementioned polyhydroxy monocarboxylic acid with the aforementioned seed compound as necessary, and by dehydration condensation polymerization in the presence of a known esterification catalyst. More specifically, a process described in U.S. Pat. No. 3,669,939, U.S. Pat. No. 5,136,014 or U.S. Pat. No. 5,418,301 can be applied without modification (the contents of which are incorporated herein).

An example of a commercially available product of hyperbranched polyester polyol (A) is a product known by the trade name of "Boltorn" manufactured by Perstorp Corporation. "Boltorn" is a hyperbranched polyester polyol obtained by condensation polymerization of 2,2-bis(hydroxymethyl)propionic acid, and although differing according to the particular grade, has a weight-average molecular weight (Mw) within the range of 1500 to 60,000, number-average molecular weight (Mn) within the range of 750 to 55,000, degree of branching (DB) within the range of 0.25 to 0.96, and ratio of Mw/Mn within the range of 1.2 to 2.1.

The transesterification used in the production process of the present invention is an alcolysis process in which hyperbranched polyester polyol (A) is reacted with an alkyl ester of a carboxylic acid having a polymerizable unsaturated double bond (B).

Examples of the aforementioned functional groups having an unsaturated double bond include vinyl groups, allyl groups, isopropenyl groups and maleimido groups. Examples of the aforementioned alkyl esters of carboxylic acid having a polymerizable unsaturated double bond (B) include acrylic acid alkyl esters, methacrylic acid alkyl esters (acrylic acid or methacrylic acid will be referred to as "(meth)acrylic acid") and alkyl esters of maleimidocarboxylic acids. Specific examples include alkyl esters having 1 to 5 carbon atoms of (meth)acrylic acid such as methyl (meth)acrylate, ethyl (meth)acrylate, propyl (meth)acrylate, butyl (meth)acrylate, pentyl (meth)acrylate and isoamyl (meth)acrylate; and, alkyl esters having 1 to 5 carbon atoms of carboxylic acids having 2 to 10 carbon atoms having a maleimido group such as methyl maleimidoacetate, ethyl maleimidoacetate, propyl maleimidoacetate, butyl maleimidoacetate, pentyl maleimidoacetate, isoamyl maleimidoacetate, methyl maleimidopropionate, ethyl maleimidopropionate, propyl maleimidopropionate, butyl maleimidopropionate, pentyl maleimidopropionate, isoamyl maleimidopropionate, methyl maleimidobutyrate, ethyl maleimidobutyrate, propyl maleimidobutyrate, butyl maleimidobutyrate, pentyl maleimidobutyrate, isoamyl maleimidobutyrate, methyl maleimidocaproate, ethyl maleimidocaproate, propyl maleimidocaproate, butyl maleimidocaproate, pentyl maleimidocaproate, isoamyl maleimidocaproate, methyl maleimidoundecanoate, ethyl maleimidoundecanoate, propyl maleimidoundecanoate, butyl maleimidoundecanoate, pentyl maleimidoundecanoate and isoamyl maleimidoundecanoate. Among these, methyl (meth)acrylate, ethyl (meth)acrylate, propyl (meth)acrylate, butyl maleimidoacetate and pentyl maleimidoacetate are particularly preferable.

The specific transesterification catalyst (C) used in the production process of the present invention is a transesterification catalyst selected from the group consisting of dialkyl tin oxides and stanoxanes. These catalysts can be used alone or two or more types can be used in combination.

Examples of dialkyl tin oxides include dimethyl tin oxide, diethyl tin oxide, dipropyl tin oxide, dibutyl tin oxide and dipropyl tin oxide.

An example of a stanoxane is the transesterification catalyst composed of a compound represented by general formula (1):

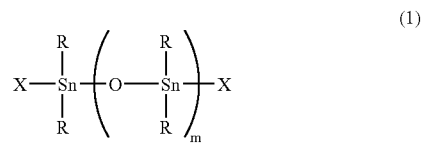

(wherein, R represents a linear or branched alkyl group, aryl group or aralkyl group having 1 to 10 carbon atoms, X represents substituents and m represents an integer of 1 to 8). The stanoxane represented by the aforementioned general formula (1) demonstrates superior catalytic activity for a transesterification of the present invention, and is particularly preferable since it allows the reaction to proceed under milder conditions than a dehydration esterification reaction and is less susceptible to the occurrence of side reactions.

Although there are no particular limitations on the substituents represented by X in the aforementioned general formula (1), a stanoxane catalyst in which X respectively and independently represents a halogen atom selected from a chlorine atom, bromine atom and fluorine atom, or a group having an lone electron pair on the atom adjacent to the tin atom such as an acyloxy group having 1 to 4 carbon atoms, hydroxyl group, mercapto group or thiocyanato group, is preferable since it demonstrates high catalytic activity. Among these, stanoxane catalysts in which X represents a halogen atom, acyloxy group or thiocyanato group are particularly preferable.

A stanoxane catalyst represented by general formula (1), in which R represents a methyl group and m represents 1 or 2, is particularly preferable. These distanoxanes or tristanoxanes have better solubility in hot water than others, and can be recovered without loss of catalytic activity by extracting from the reaction mixture with hot water following completion of the transesterification. At the same time, catalyst remaining in the reaction product can also be easily removed, thereby offering the advantage of facilitating purification of the reaction product. In addition, since a comparison of distanoxanes and tristanoxanes reveals that tristanoxanes have superior stability in hot water than distanoxanes and are more resistant to degradation, they can be used more preferably in the production process of the present invention.

Examples of the aforementioned distanoxanes or tristanoxanes include ClSn(CH$_3$)$_2$OSn(CH$_3$)$_2$Cl, ClSn(CH$_3$)$_2$OSn(CH$_3$)$_2$OCOCH$_3$, ClSn(CH$_3$)$_2$OSn(CH$_3$)$_2$OCH$_3$, CH$_3$COOSn(CH$_3$)$_2$OSn(CH$_3$)$_2$OCOCH$_3$, ClSn(CH$_3$)$_2$OSn(CH$_3$)$_2$OCOCH$_2$CH$_3$, ClSn(CH$_3$)$_2$OSn(CH$_3$)$_2$SCN, NCSSn(CH$_3$)$_2$OSn(CH$_3$)$_2$SCN, Cl(Sn(CH$_3$)$_2$O)$_2$Sn(CH$_3$)$_2$Cl, Cl(Sn(CH$_3$)$_2$O)$_2$Sn(CH$_3$)$_2$OCOCH$_3$, Cl(Sn(CH$_3$)$_2$O)$_2$Sn(CH$_3$)$_2$OCH$_3$, CH$_3$COO(Sn(CH$_3$)$_2$O)$_2$Sn(CH$_3$)$_2$OCOCH$_3$, Cl(Sn(CH$_3$)$_2$O)$_2$Sn(CH$_3$)$_2$OCOCH$_2$CH$_3$, Cl(Sn(CH$_3$)$_2$O)$_2$Sn(CH$_3$)$_2$SCN and NCS(Sn(CH$_3$)$_2$O)$_2$Sn(CH$_3$)$_2$SCN.

The amount of transesterification catalyst (C) used in the production process of the present invention should be suitably determined according to the type of transesterification catalyst (C), type of alkyl ester of a carboxylic acid having a polymerizable unsaturated double bond (B), the molecular weight of hyperbranched polyester polyol (A), and the quantity of functional groups desired to be introduced.

There are no particular limitations on the type and amount of reaction solvent used in the transesterification of the present invention provided it does not impair the transesterification. If a mixture of the hyperbranched polyester polyol (A) and the alkyl ester of a carboxylic acid having a polymerizable unsaturated double bond (B) is a liquid and has fluidity at the reaction temperature, then it is not always necessary to use a solvent. In general, in cases requiring a high conversion rate, it is preferable to remove alcohols and esters formed in the transesterification outside the system, and in the case of forming an alcohol in particular, it is preferable to use an organic solvent which can form an azeotropic mixture with the alchol.

Examples of reaction solvents that can be used include aliphatic or alicyclic hydrocarbons having 4 to 10 carbon atoms and mixtures thereof, specific examples of which include n-pentane, n-hexane, n-heptane, n-octane, cyclohexane, benzene, toluene, o-xylene, m-xylene, p-xylene, mesitylene, ethylbenzene and cumene. Particularly preferable examples of these hydrocarbon-based solvents include n-hexane, n-heptane, cyclohexane and toluene. These reaction solvents can be used alone or two or more types can be used in combination.

In the present invention, although it is difficult for the polymerizable unsaturated double bonds to cause thermal polymerization since the transesterification is carried out under mild conditions, it is preferable to combine the use of a polymerization inhibitor to completely inhibit thermal polymerization during the reaction.

Examples of polymerization inhibitors include benzoquinone, hydroquinone, catechol, diphenylbenzoquinone, hydroquinone monomethyl ether, naphthoquinone, t-butyl catechol, t-butyl phenol, dimethyl-t-butyl phenol, t-butyl cresol and phenothiadine. In the case of using these polymerization inhibitors, they can be used alone or two or more types can be used in combination.

Although dependent on the amount of polymerizable unsaturated double bonds in the reaction system, the amount of polymerization inhibitor used is normally within the range of 5 to 10,000 ppm by mass, and particularly preferably within the range of 20 to 7,000 ppm by mass, with respect to the reactants.

In addition, in order to inhibit thermal polymerization during the reaction, it is preferable to carry out the transesterification under an oxygen-containing gas atmosphere after having added the aforementioned polymerization inhibitor. Here, although the oxygen-containing gas may be air, since increasing the oxygen content results in the risk of ignition and explosion while also leading to the risk of coloring of the product, it is preferable to use a gas having an oxygen content of 5 to 13% by volume.

The reaction temperature of the aforementioned transesterification should be suitably determined according to the alkyl ester of a carboxylic acid having a polymerizable unsaturated double bond (B), the reaction solvent, or the reaction pressure. Normally, the reaction temperature is within the range of 20 to 150° C., is preferably as low as possible, and a temperature that does not exceed 120° C. is preferable.

The charging ratio of the hyperbranched polyester polyol (A) to alkyl ester of a carboxylic acid having a polymerizable unsaturated double bond (B) in the production process of the present invention is suitably determined according to the introduction ratio of the polymerizable unsaturated double bonds into hyperbranched polyester polyol (A). For example, in the case of introducing vinyl groups or isopropenyl groups into all of the hydroxyl groups of hyperbranched polyester polyol (A), the number of moles of an alkyl ester of (meth) acrylic acid is preferably at least 1.2 times the number of moles of the hydroxyl groups possessed by hyperbranched polyester polyol (A).

In addition, the degree of progression of the transesterification can be determined by the amount of alcohol formed during the reaction by, for example, gas chromatography analysis.

According to the production process of the present invention, a polymerizable hyperbranched polyester can be easily obtained in which the rate at which the introduction rate of polymerizable unsaturated double bonds relative to all of the hydroxyl groups in the aforementioned hyperbranched polyester polyol (A) is 25 to 100%.

There are various methods to purify a polymerizable hyperbranched polyester obtained by the production process of the present invention according to the application. Examples of purification methods include, but are not limited to, the methods described in (1) to (3) below.

(1) A method in which the alkyl ester of a carboxylic acid having a polymerizable unsaturated double bond (B), or a reaction solvent, that remains in the reaction mixture following completion of the transesterification is distilled off from the reaction vessel and then used as is.

(2) A method in which transesterification catalyst (C) used in the reaction is removed by washing with acid or a basic aqueous solution after diluting by adding an inert solvent as necessary.

(3) A method in which, in the case the transesterification catalyst (C) used in the reaction is the aforementioned highly soluble stanoxane, after washing the reaction mixture directly with hot water at 30 to 80° C., or as necessary, after washing a diluted mixture by adding an organic solvent that is incompatible with water and inert with respect to the alkyl ester of a carboxylic acid having a polymerizable unsaturated double bond (B) with hot water at 30 to 80° C., the organic solvent is distilled off from the organic layer to obtain a polymerizable hyperbranched polyester of the present invention.

According to the aforementioned method of (3), the catalyst can be recovered from the washing with almost no loss of their activity. The recovered catalyst can therefore be reused.

According to the production process of the present invention, a polymerizable hyperbranched polyester can be produced in which the weight-average molecular weight (Mw) is 1,700 to 90,000, the number-average molecular weight (Mn) is 850 to 85,000, the ratio of Mw to Mn (referred to as $(Mw/Mn)^{PE}$) is 1.1 to 2.5, and polymerizable unsaturated double bonds introduced into the terminals per molecule are 5 to 600, and preferably 8 to 600. In addition, according to the production process of the present invention, a polymerizable hyperbranched polyester can be produced by using a hyperbranched polyester polyol in which the ratio of Mw to Mn (referred to as $(Mw/Mn)^{PO}$) is 1.1 to 2.5 such that the aforementioned value of $(Mw/Mn)^{PE}$ is roughly the same as the value of $(Mw/Mn)^{PO}$. The difference between the aforementioned $(Mw/Mn)^{PE}$ and $(Mw/Mn)^{PO}$ [$(Mw/Mn)^{PE} - (Mw/Mn)^{PO}$] is preferably within the range of 0 to 0.5.

A polymerizable hyperbranched polyester obtained according to the production process of the present invention is useful in a wide range of applications including coating materials, adhesives, films, sheets, moldings and electronic materials due to its characteristic structure.

In addition, since a polymerizable hyperbranched polyester of the present invention is polymerized by active energy rays, heat or radical polymerization initiators and so on, the addition of a small amount of a polymerizable hyperbranched polyester during polymerization of a vinyl polymerizable monomer can improve the melt flow characteristics of a themolprastic resin composed of the resulting copolymer.

EXAMPLES

The following provides a more detailed explanation of the present invention using its examples. In this section, the terms "parts" and "%" respectively represent "parts by weight " and "percent by weight" unless specifically indicated otherwise.

<Hyperbranched Polyester Polyol (A)>

In the following examples and comparative examples, commercially available hyperbranched polyester polyols obtained by condensation polymerization of 2,2-bis (hydroxymethyl)propionic acid consisting of Boltorn H30 (Perstorp Corp., weight-average molecular weight (Mw)=4280, number-average molecular weight (Mn)=2920, Mw/Mn=1.47, degree of branching=0.34, number of hydroxyl groups per molecule=25), and Boltorn H40 (weight-average molecular weight (Mw)=6730, number-average molecular weight (Mn)=3440, Mw/Mn=1.96, degree of branching=0.34, number of hydroxyl groups per molecule=30) were used for hyperbranched polyester polyol (A).

<Degree of Branching>

The degree of branching of the hyperbranched polyester polyols (A) used in the following examples and comparative examples was calculated based on the results of NMR measurements under the conditions indicated below.

Device: "Lambda 300" (300 MHz), manufactured by JEOL

Reference substance: Tetramethylsilane (0 ppm)

Measuring solvent: Acetone d6

D unit peak:, T unit peak:, L unit peak:

<Gel Permeation Chromatography>

The molecular weight and molecular weight distributions of the hyperbranched polyester polyols (A) and formed polymerizable hyperbranched polyesters in the following examples and comparative examples were measured by gel permeation chromatography (GPC). The measuring conditions were as indicated below.

Device: "HPLC8010", manufactured by Tosoh Corporation

Column: Shodex KF802×2+KF803+KF804

Eluate: THF, 1.0 ml/min.

<Gas Chromatography>

The amount of ethanol in the distillates used to calculate the reaction rates of the transesterification in the following examples and comparative examples was measured by gas chromatography. The measuring conditions were as indicated below.

Device: "GC-17A", manufactured by Shimadzu Corporation

Column: "DB-5", manufactured by J&W (length: 30 m, inner diameter: 0.25 mm, liquid phase thickness: 0.25 μm)

Carrier gas: He

<Nuclear Magnetic Resonance Spectroscopy>

The quantity of polymerizable unsaturated double bonds introduced into hyperbranched polyester polyols (A) in the following examples and comparative examples was calculated from the results of measurements by nuclear magnetic resonance spectroscopy (NMR).

Device: "Lambda 300" (300 MHz), manufactured by JEOL

Reference substance: Tetramethylsilane (0 ppm)

Synthesis Example 1

Synthesis of Cl $(Sn(CH_3)_2O)_2Sn(CH_3)_2Cl$

This compound was synthesized in accordance with the process described in the Journal of the Society of Chemical Industry (Vol. 73, p. 1010, 1970). As a result of elementary analysis, the product consisted of Sn=64.7% (theoretical value: 64.8%) and Cl=12.7% (theoretical value: 12.9%), which agreed with the theoretical values of $Cl(Sn(CH_3)_2O)_2 Sn (CH_3)_2Cl$. (This compound is referred to as the tristanoxane obtained in Synthesis Example 1).

Example 1

10 parts of Boltorn H40, 0.25 parts of the tristanoxane obtained in Synthesis Example 1, 100 parts of ethyl acrylate and 0.05 parts of hydroquinone were added to a reaction vessel equipped with a stirrer, a gas bubbling tube, thermometer and Dean-Stark decanter provided with condenser, followed by heating while stirring and blowing into the mixed solution a mixed gas of nitrogen and oxygen (oxygen content: 7% by volume) through the gas bubbling tube at the rate of 3 ml/min. At this time, the heating power was adjusted so that the amount of distillate to the decanter was 15 to 20 parts per hour (reaction temperature: 92° C. to 95° C.), the distillate in the decanter was removed every hour and an equal amount of fresh ethyl acrylate was added to the reaction vessel, and the reaction was carried out for 20 hours.

Following completion of the reaction, the residue obtained by distilling off the unreacted ethyl acrylate from the reaction mixture under reduced pressure, was dissolved in 70 parts of ethyl acetate, and washed three times with 30 parts of hot water at 50° C. to extract the catalyst. Subsequently, the ethyl acetate solution was washed four times with 20 parts of 5% aqueous sodium hydroxide solution to remove the hydroquinone in the ethyl acetate solution, followed by additionally washing once with 20 parts of 1% aqueous sulfuric acid solution and twice with 20 parts of water. After adding 0.0045 parts of methoquinone to the resulting ethyl acetate solution, the organic solvent was distilled off from the ethyl acetate solution while introducing a mixed gas of nitrogen and oxygen (oxygen content: 7% by volume) under reduced pressure to obtain 13 parts of a polymerizable hyperbranched polyester (A-1). The weight-average molecular weight of the resulting polymerizable hyperbranched polyester (A-1) was 7,730, the number-average molecular weight was 3,880, and the introduction rate of vinyl groups into hyperbranched polyester polyol (A) was 85 mol % (equivalent to 25.5 vinyl groups per molecule).

Example 2

10 parts of Boltorn H40, 1.25 parts of dibutyl tin oxide, 100 parts of methyl methacrylate and 0.05 parts of hydroquinone were added to a reaction vessel equipped with a stirrer, a gas bubbling tube, thermometer and Dean-Stark decanter provided with condenser, followed by heating while stirring and blowing into the mixed solution a mixed gas of nitrogen and oxygen (oxygen content: 7% by volume) through the gas bubbling tube at the rate of 3 ml/min. At this time, the heating power was adjusted so that the amount of distillate to the decanter was 15 to 20 parts per hour (reaction temperature: 92° C. to 95° C.), the distillate in the decanter was removed every hour and an equal amount of fresh ethyl acrylate was added to the reaction vessel, and the reaction was carried out for 12 hours.

Following completion of the reaction, the unreacted methyl methacrylate was distilled off from the reaction mixture under reduced pressure. Then, 10 parts of acetic acid anhydride and 2 parts of sulfaminic acid were added and stirred for 10 hours at room temperature to cap the unreacted hydroxyl groups in hyperbranched polyester polyol (A). After the sulfaminic acid was filtered off from the mixture, the acetic acid anhydride and acetic acid were distilled from the filtrate under reduced pressure. The resulting residue was dissolved in 70 parts of ethyl acetate, and washed three times with 30 parts of hot water at 50° C. to extract the catalyst. Subsequently, the ethyl acetate solution was washed four times with 20 parts of 5% aqueous sodium hydroxide solution to remove the hydroquinone contained in the ethyl acetate solution, followed by additionally washing once with 20 parts of 1% aqueous sulfuric acid solution and twice with 20 parts of water. After adding 0.0045 parts of methoquinone to the resulting ethyl acetate solution, the organic solvent was distilled off from the ethyl acetate solution while introducing a mixed gas of nitrogen and oxygen (oxygen content: 7% by volume) under reduced pressure to obtain 12 parts of a polymerizable hyperbranched polyester (A-2). The weight-average molecular weight of the resulting polymerizable hyperbranched polyester (A-2) was 7,540, the number-average molecular weight was 3,770, and the introduction rate of isopropenyl groups and acetyl groups into hyperbranched polyester polyol (A) were 55 mol % (equivalent to 16.5 isopropenyl groups per molecule) and 40 mol %, respectively.

Comparative Example 1

10 parts of Boltorn H40, 0.8 parts of para-toluene sulfonic acid, 100 parts of ethyl acrylate and 0.05 parts of hydroquinone were added to a reaction vessel equipped with a stirrer, a gas bubbling tube, thermometer and Dean-Stark decanter provided with condenser, followed by heating while stirring and blowing into the mixed solution a mixed gas of nitrogen and oxygen (oxygen content: 7% by volume) through the gas bubbling tube at the rate of 3 ml/min. At this time, the heating power was adjusted so that the amount of distillate to the decanter was 15 to 20 parts per hour (reaction temperature: 92° C. to 95° C.), the distillate in the decanter was removed every hour and an equal amount of fresh ethyl acrylate was added to the reaction vessel, and the reaction was carried out for 20 hours. A large amount of a solid thought to be a gelled substance was floating in the reaction solution.

Following completion of the reaction, the gelled substance was separated by filtration. The unreacted ethyl acrylate was distilled off from the filtrate under reduced pressure, and the resulting residue was dissolved in 30 parts of ethyl acrylate. Subsequently, the ethyl acetate solution was washed twice with 10 parts of 5% aqueous sodium hydroxide solution to remove the hydroquinone in the ethyl acetate solution, followed by additionally washing once with 10 parts of 1% aqueous sulfuric acid solution and twice with 10 parts of water. After adding 0.002 parts of methoquinone to the resulting ethyl acetate solution, the organic solvent was distilled off from the ethyl acetate solution while introducing a mixed gas of nitrogen and oxygen (oxygen content: 7% by volume) under reduced pressure to obtain 3 parts of a polymerizable hyperbranched polyester (a-1). The weight-average molecular weight of the resulting polymerizable hyperbranched polyester (a-1) was 14,070, the number-average molecular weight was 4,330, and the introduction rate of vinyl groups into hyperbranched polyester polyol (A) was 85 mol %.

Comparative Example 2

Although the reaction was carried out for 20 hours in the same manner as Comparative Example 1 with the exception of carrying out the reaction of Comparative Example 1 under reduced pressure (26.6 kPa), there was almost no ethanol in the distillate, and nearly all of the raw materials remained in the reaction vessel still unreacted.

TABLE 1

|  | Catalyst | Transesterification conditions | Pre-reaction Mw, Past-reaction Mw | Rate of increase in Mw after reaction | Pre-reaction Mn, Past-reaction Mn | Rate of increase in Mn after reaction | Pre-reaction Mw/Mn past-reaction Mw/Mn | Introduction rate of groups having polymerizable unsaturated double bonds | |
|---|---|---|---|---|---|---|---|---|---|
|  |  |  |  |  |  |  |  | Vinyl groups | Isopropenyl groups |
| Ex. 1 | Tri-stanoxane | Normal pressure, oxygen feed | 6730 7730 | 15% | 3440 3880 | 13% | 1.96 1.99 | 85 mol % | |
| Ex. 2 | Dibutyl tin oxide | Normal pressure, oxygen feed | 6730 7540 | 12% | 3440 3770 | 10% | 1.96 2.00 | | 55 mol % |

TABLE 1-continued

| | Catalyst | Transesterification conditions | Pre-reaction Mw, Post-reaction Mw | Rate of increase in Mw after reaction | Pre-reaction Mn, Post-reaction Mn | Rate of increase in Mn after reaction | Pre-reaction Mw/Mn past-reaction Mw/Mn | Introduction rate of groups having polymerizable unsaturated double bonds | |
|---|---|---|---|---|---|---|---|---|---|
| | | | | | | | | Vinyl groups | Isopropenyl groups |
| Comp. Ex. 1 | p-toluene sulfonic acid | Normal pressure, oxygen feed | 6730 14070 | 109% | 3440 4330 | 26% | 1.96 3.24 | (gelling) 85 mol % | |
| Comp. Ex. 2 | p-toluene sulfonic acid | Reduced pressure, oxygen feed | 6730 (no reaction) | | 3440 (no reaction) | | 1.96 — | (no reaction) | |

The following were determined based on the results shown in Table 1.
(1) Since there were no changes in the value of Mw/Mn before and after the reaction in each of the examples according to the production process of the present invention, the original backbone structure of the molecular chains in hyperbranched polyester polyol (A) was determined to have not been altered by hydrolysis and so forth.
(2) According to the production process of the present invention, side reactions such as nucleophilic addition reactions of terminal hydroxyl groups to polymerizable unsaturated double bonds of hyperbranched polyester polyol (A), and thermal polymerization reactions of the polymerizable unsaturated double bonds, were determined to not occur.
(3) In the production process of Comparative Example 1 wherein an acid catalyst like p-toluene sulfonic acid was used for transesterification catalyst (C), since the value of Mw/Mn after the reaction increased considerably, the original backbone structure of the molecular chains in hyperbranched polyester polyol (A) was found to have been altered by hydrolysis and so forth.
(4) Since gelling occurred in the production process of Comparative Example 1 that used an acid catalyst, side reactions such as nucleophilic addition reactions of terminal hydroxyl groups to polymerizable unsaturated double bonds of hyperbranched polyester polyol (A), and thermal polymerization reactions of the polymerizable unsaturated double bonds, were determined to have occurred.

Example 3

A reaction was carried out for 16 hours in the same manner as Example 1 with the exception of using Boltorn H30 instead of Boltorn H40 in Example 1. At that time, the ethanol formed by the transesterification was measured every hour to determine the reaction conversion rates corresponding to the introduction rates of polymerizable unsaturated double bonds calculated from the amounts of ethanol. Those results are summarized in FIG. 1. From the results shown in FIG. 1, the introduction rates of polymerizable unsaturated double bonds by transesterification with respect to the total number of hydroxyl groups in hyperbranched polyester polyol (A) at the stage of reacting for 10 hours and the stage of reacting for 16 hours were 61% or more, and 78%, respectively.

Comparative Example 3

With the exception of using 1.53 parts of dibutyl tin dilaurate instead of the tristanoxane obtained in Synthesis Example 1 in Example 3, the reaction was carried out for 10 hours in the same manner as Example 3. The introduction rates (reaction conversion rates) of polymerizable unsaturated double bonds were determined in the same manner as Example 3, and those results are summarized in FIG. 1. In the reaction system of Comparative Example 3, the introduction rate of polymerizable unsaturated double bonds reached only 10% even after reacting for 10 hours.

Comparative Example 4

With the exception of using 0.97 parts of dimethyl dichloro tin instead of the tristanoxane obtained in Synthesis Example 1 in Example 3, the reaction was carried out for 5 hours in the same manner as Example 3. The introduction rates (reaction conversion rates) of polymerizable unsaturated double bonds were determined in the same manner as Example 3, and those results are summarized in FIG. 1. In the reaction system of Comparative Example 4, the introduction rate of polymerizable unsaturated double bonds was 0% even after reacting for 5 hours.

Based on the results shown in FIG. 1, dibutyl tin dilaurate and dimethyl dichloro tin were determined to be unsuitable as transesterification catalysts used in the production process of the present invention.

INDUSTRIAL APPLICABILITY

According to the production process of the present invention, a polymerizable hyperbranched polyester can be produced in which polymerizable unsaturated double bonds have been introduced into the terminals of a hyperbranched polyester polyol (A) without causing side reactions such as nucleophilic addition reactions of terminal hydroxyl groups to polymerizable unsaturated double bonds, or thermal polymerization of the polymerizable unsaturated double bonds.

In addition, according to the production process of the present invention, the polymerizable hyperbranched polyester can be produced at high efficiency by a transesterification using an alkyl ester of a carboxylic acid having a polymerizable unsaturated double bond (B), which is easily obtained as an industrial raw material, and without altering the original backbone structure of the molecular chains of the hyperbranched polyester polyol (A) by hydrolysis and so forth.

What is claimed is:

1. A production process of a polymerizable hyperbranched polyester comprising:

introducing polymerizable unsaturated double bonds into terminals of a hyperbranched polyester polyol (A), which is obtained by condensation polymerization of a polyhydroxy monocarboxylic acid in which there are at least two hydroxyl groups, the carbon atom adjacent to the carboxy group is saturated carbon atom, and the hydrogen atoms on said carbon atom are all substituted, by reacting the hyperbranched polyester polyol (A) and an alkyl ester of a carboxylic acid having a polymerizable unsaturated double bond (B) by a transesterification in the presence of at least one type of transesterification catalyst (C) selected from the group consisting of a dialkyl tin oxide and a stanoxane.

2. The production process of a polymerizable hyperbranched polyester according to claim 1 wherein the weight-average molecular weight of the hyperbranched polyester polyol (A) is 1,500 to 60,000.

3. The production process of a polymerizable hyperbranched polyester according to claim 2 wherein the ratio of the weight-average molecular weight to the number-average molecular weight of the hyperbranched polyester polyol (A) $(Mw/Mn)^{PO}$ is 1.1 to 2.5.

4. The production process of a polymerizable hyperbranched polyester according to claim 1 wherein the degree of branching of the hyperbranched polyester polyol (A) is 0.25 to 1.0.

5. The production process of a polymerizable hyperbranched polyester according to claim 1 wherein the hyperbranched polyester polyol (A) has 12 to 600 hydroxyl groups per molecule.

6. The production process of a polymerizable hyperbranched polyester according to claim 1 wherein the introduction rate of polymerizable unsaturated double bonds to the total number of hydroxyl groups in the hyperbranched polyester polyol (A) is 25% to 100%.

7. The production process of a polymerizable hyperbranched polyester according to claim 1 wherein the weight-average molecular weight of the polymerizable hyperbranched polyester is 1,700 to 90,000.

8. The production process of a polymerizable hyperbranched polyester according to claim 7 wherein the ratio of the weight-average molecular weight to the number-average molecular weight of the polymerizable hyperbranched polyester $(Mw/Mn)^{PE}$ is 1.1 to 2.5.

9. The production process of a polymerizable hyperbranched polyester according to claim 8 wherein the difference between the ratio of the weight-average molecular weight to the number-average molecular weight of the polymerizable hyperbranched polyester $(Mw/Mn)^{PE}$ and the ratio of the weight-average molecular weight to the number-average molecular weight of the hyperbranched polyester polyol (A) $(Mw/Mn)^{PO}$ is 0 to 0.5.

10. The production process of a polymerizable hyperbranched polyester according to claim 1 wherein the polymerizable hyperbranched polyester has 5 to 600 polymerizable unsaturated double bonds per molecule.

11. The production process according to claim 1 wherein the stanoxane is a compound represented by the following general formula (1):

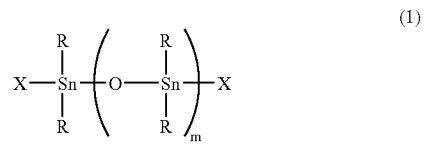

(wherein, R represents a linear or branched alkyl group, aryl group or aralkyl group having 1 to 10 carbon atoms, X represents a halogen atom, acyloxy group having 1 to 4 carbon atoms, hydroxyl group, mercapto group or thiocyanato group, and m represents an integer of 1 to 8).

12. The production process according to claim 11 wherein R represents a methyl group and m is 1 or 2.

13. The production process according to claim 1 wherein the alkyl ester of a carboxylic acid having a polymerizable unsaturated double bond (B) is a compound selected from the group consisting of acrylic acid alkyl esters, methacrylic acid alkyl esters and alkyl esters of maleimidocarboxylic acids.

* * * * *